No. 783,436. PATENTED FEB. 28, 1905.
T. HUBERDEAU.
WIRE FENCE GUARD.
APPLICATION FILED DEC. 7, 1904.
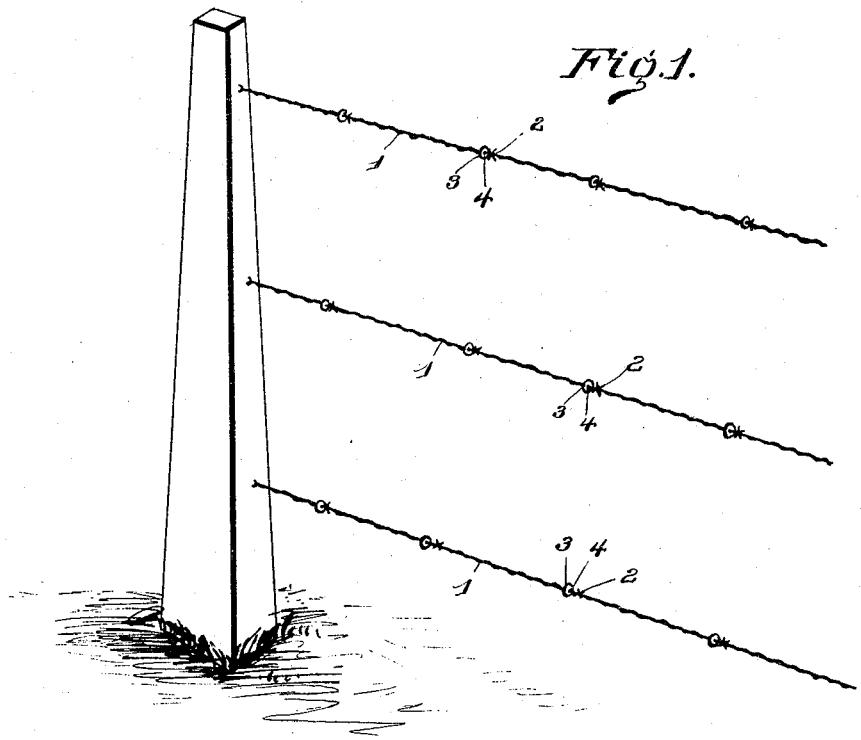
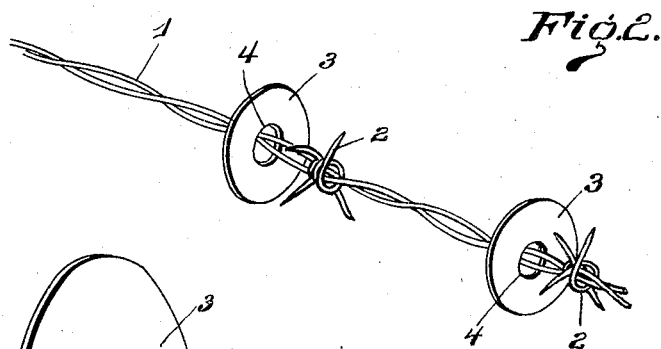
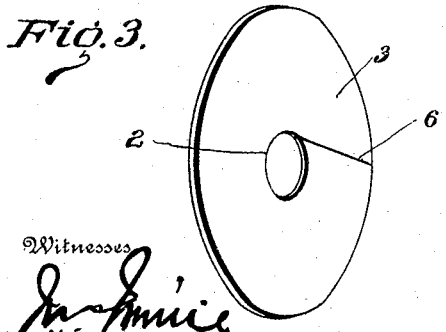
Inventor
Thomas Huberdeau No. 783,436. Patented February 28, 1905.

UNITED STATES PATENT OFFICE.

THOMAS HUBERDEAU, OF LARIMORE, NORTH DAKOTA.

WIRE-FENCE GUARD.

SPECIFICATION forming part of Letters Patent No. 783,436, dated February 28, 1905.

Application filed December 7, 1904. Serial No. 235,840.

*To all whom it may concern:*

Be it known that I, THOMAS HUBERDEAU, a citizen of the United States, residing at Larimore, in the county of Grand Forks and State of North Dakota, have invented certain new and useful Improvements in Wire-Fence Guards, of which the following is a specification.

This invention provides improvements in means adapted for use in connection with barbed-wire fences to form a guard or protector for the barbs of the line-wires under certain conditions of service.

As is well known, valuable animals are often permanently injured by being cut or marred by the barbs of barbed-wire fences as they come into contact with the same in running to and fro in the field.

This invention embodies guard devices for coöperation with the individual barbs of the fence to protect the animal from being cut by the barbs should it come into contact with the fence at an angle while innocently moving about the field, but not interfering with the thorough effectiveness of the barbs should the animal attempt to breach the closure.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still some of the preferred embodiments are shown in the accompanying drawings, in which—

Figure 1 is a perspective view of a wire fence, showing the invention as when in use. Fig. 2 is an enlarged perspective view of the barbed wire, bringing out more clearly the guard device carried thereby. Fig. 3 is a detail perspective view of a modified form of guard member.

Corresponding and like parts are referred to in the following description and indicated in all the views of the drawings by the same reference characters.

In showing the application of the invention a barbed-wire fence of ordinary structure is illustrated, the line-wire being designated 1 and the barbs 2. The guard devices which comprise the invention are carried by the line-wires 1 and consist of disks or plates 3, provided centrally thereof with openings 4 to receive the line-wires. The openings 4 of the members 3 are sufficiently large to allow these members to move freely along the wires 1, said members thereby being loosely supported. The members 3 are of circular formation, preferably, and are of such diameter that when the disks are alongside of the barbs 2 of the wire 1 the said barbs do not project from the edge portions of the disks and are thus not liable to cut and injure an animal moving against the wires 1 at an angle thereto. The members 3, as before mentioned, are loosely mounted upon the line-wires 1, so that they may move freely away from the barbs 2, and, indeed, the normal position of each of the said members 3 will properly be at a point about intermediate the adjacent barbs.

From the foregoing it will be seen that the effectiveness of the barbs in preventing breaching of the fence is not destroyed, for the reason that the parts 3 do not guard or protect an animal directly into contact with said barbs.

It is desirable in order to apply the invention to fences which have already been wired to provide the members 3 with a slit extending from the opening therein to the edge, and by so doing the plates or disks may be quickly attached to the line-wires 1 by forcing said wires through the slit portion, (indicated more clearly at 6 in Fig. 3 of the drawings.) The device as hereinbefore described is comparatively inexpensive and does not materially increase the cost of constructing a fence of barbed wire, affording at the same time a practical means for the purpose hereinbefore set forth.

The portions of the plate or disk 3 upon opposite sides of the slit 6 therein are arranged in meeting position, and the sides of the plate are therefore smooth. The slit 6, further, is arranged at a tangent to the opening 4 in the plate 3, and the plate is therefore free to move upon the wire carrying the same, as far as rotation is concerned.

Having thus described the invention, what is claimed as new is—

A guard for barbed-wire fences comprising a plate having a central opening, said plate having a slit arranged at a tangent to the opening aforesaid and extending radially therefrom to the peripheral portion of the plate, the portions of the body of the plate upon opposite sides of the slit being brought together to afford a smooth and continuous surface.

In testimony whereof I affix my signature in presence of two witnesses.

THOMAS HUBERDEAU. [L. S.]

Witnesses:
A. STONEHOUSE,
G. W. SWENGE.